(12) United States Patent
Sakai et al.

(10) Patent No.: US 7,676,102 B2
(45) Date of Patent: Mar. 9, 2010

(54) IMAGE COMPRESSION APPARATUS, IMAGE COMPRESSION PROGRAM AND IMAGE COMPRESSION METHOD

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 893 days.

(21) Appl. No.: 11/485,345

(22) Filed: Jul. 13, 2006

(65) Prior Publication Data

US 2007/0248271 A1  Oct. 25, 2007

(30) Foreign Application Priority Data

Apr. 24, 2006  (JP) .............................. 2006-119178

(51) Int. Cl.
*G06K 9/36* (2006.01)
(52) U.S. Cl. ...................... 382/238; 382/232; 382/233; 382/236
(58) Field of Classification Search ................. 382/232, 382/233, 236, 238, 239; 375/240.11, 240.12, 375/E7.262, E7.031
See application file for complete search history.

(56) References Cited

U.S. PATENT DOCUMENTS 6,519,284 B1 * 2/2003 Pesquet-Popescu et al. ..................... 375/240.11
7,336,720 B2 * 2/2008 Martemyanov et al. 375/240.12
2005/0111746 A1 5/2005 Kumar et al. ................ 382/248

FOREIGN PATENT DOCUMENTS

| CN | 1322442 A | 11/2001 |
|---|---|---|
| JP | 10-153737 | 6/1998 |
| JP | 2001-94992 | 4/2001 |
| JP | 2005-152645 | 6/2005 |
| JP | 2005-245922 | 9/2005 |

OTHER PUBLICATIONS

Office Action, mailed Jun. 19, 2009, in corresponding Chinese Patent Application No. 200610108343.8 (13 pp.).

* cited by examiner

*Primary Examiner*—Anh Hong Do
(74) *Attorney, Agent, or Firm*—Staas & Halsey LLP

(57) ABSTRACT

An image compression apparatus is provided which includes an image dividing section that divides 3D image data into a plurality of units of data, 3D image data being composed of a plurality of frames, a pixel selection section that sequentially selects a pixel in one of the plurality of units as a target pixel in a predetermined order and selects pixels located within a predetermined range near the target pixel as reference pixels, a prediction error calculation section that calculates a prediction value of a target pixel value which is a pixel value of the target pixel, according to the pixel values of the reference pixels and calculates a prediction error which is a difference between the prediction value and the target pixel value, and an entropy coding section that performs entropy coding of the prediction error in each of the plurality of units.

20 Claims, 10 Drawing Sheets

REFERENCE PIXELS IN TARGET FRAME (i)

FIG. 6

$$P = \sum_{i=1}^{R} W_i X_i + C$$

$$e = \sum_{k=1}^{F} (X_k - P)^2 = \sum_{k=1}^{F} \left( X_k - \sum_{i=1}^{R} W_i X_i + C \right)^2$$

FIG. 9
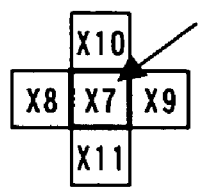
SAME POSITION AS THAT OF TARGET PIXEL
REFERENCE PIXELS IN FRAME (j-1) IMMEDIATELY PRECEDING TARGET FRAME
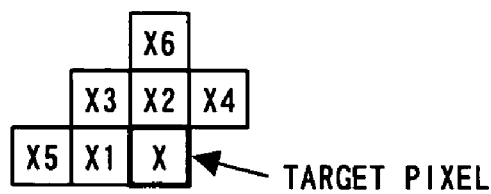
TARGET PIXEL
REFERENCE PIXELS IN TARGET FRAME (j)

FIG. 10

$$P = \sum_{i=1}^{S} W_i X_i + C$$

$$e = \sum_{k=1}^{G} (X_k - P)^2 = \sum_{k=1}^{G} \left( X_k - \sum_{i=1}^{S} W_i X_i + C \right)^2$$

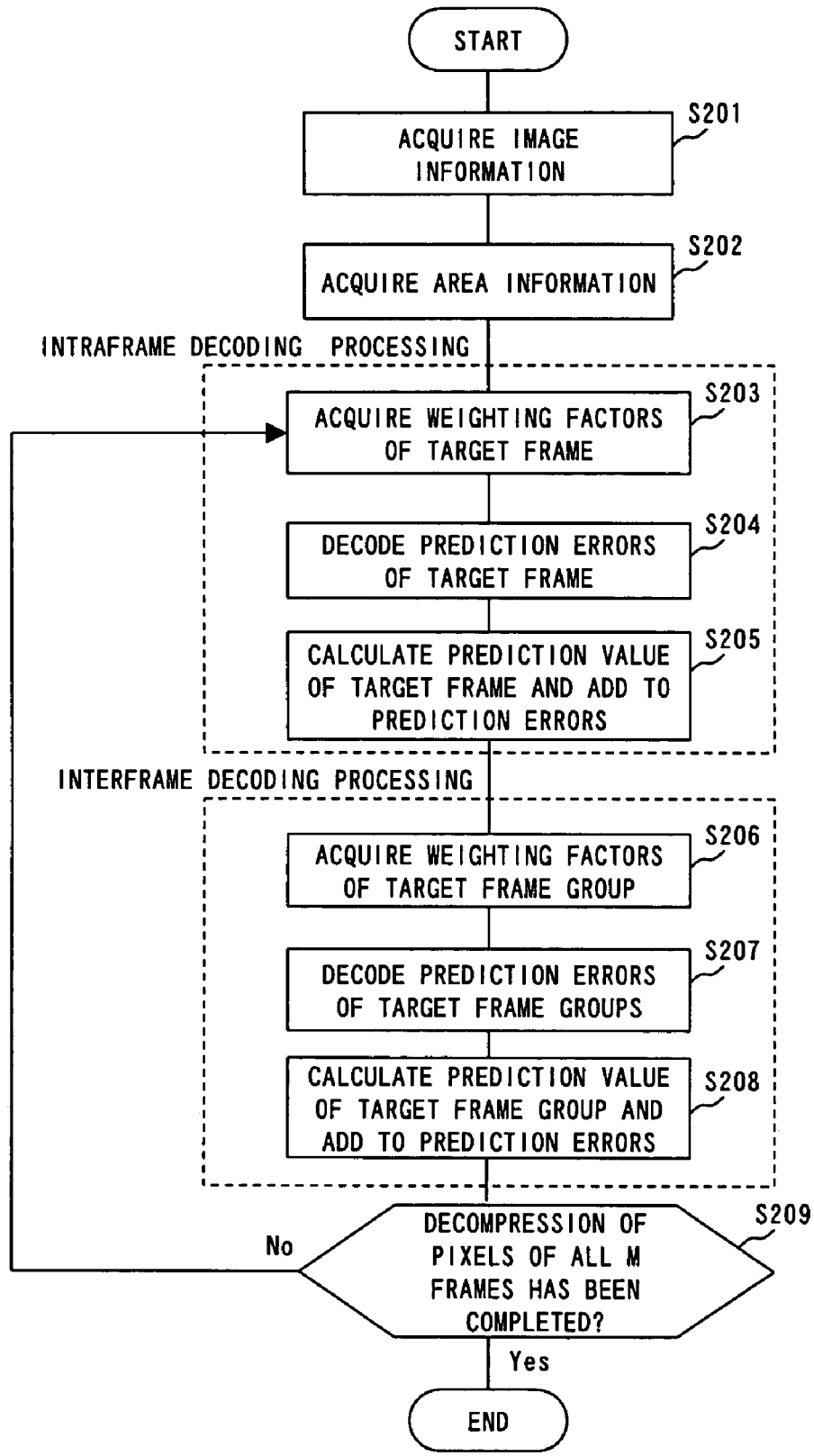

IMAGE COMPRESSION APPARATUS, IMAGE COMPRESSION PROGRAM AND IMAGE COMPRESSION METHOD

BACKGROUND OF THE INVENTION

1. Field of the Invention

The present invention relates to an image compression apparatus, an image compression program, and an image compression method that perform lossless compression of a 3D image.

2. Description of the Related Art

Performance of an imaging diagnostic apparatus such as a CT (Computed Tomography) or MR (Magnetic Resonance) has recently been improved. This allows, for example, imaging of the cross-section of a human body with a slice interval of as small as less than 1 mm. With such an imaging diagnostic apparatus, a multislice image constituted by a plurality of frames can be obtained as a scanned image per one inspection. The multislice image is obtained by sequentially scanning a cross-section image (frame) while changing the coordinate of the axis perpendicular to the cross-section image for each slice interval. When the slice interval is decreased, the number of frames of the multislice image that can be obtained per one inspection is increased up to several hundred to thousand, which corresponds to several hundred MB (Byte) in terms of data capacity.

The scanned multislice images are stored in an image server installed in a computer room of a medical institution and are transferred to a client terminal via a network at reading time or physical examination time for display or reference. Medical images that have been used in physical examination are legally required to be kept for a long period of time, so that the amount of image data to be stored is increasing yearly. Therefore, compression of the medical image is essential for increasing the storage amount of the data in an image server. Further, there is a strong demand that the scanned medical image is stored without degradation and, therefore, a lossless (reversible) compression method has often been used.

Examples of a conventional lossless image compression method applied to the medical image include lossless JPEG (Joint Photographic Experts Group), JPEG-LS (Lossless), JPEG 2000, and the like. Presently, Lossless JPEG is used most widely, and JPEG 2000 is used partly.

Lossless JPEG uses one to three pixels selected from among three neighboring pixels of a target pixel to calculate a prediction value of the target pixel and applies Huffman coding to a difference between the calculated prediction value and the true value of the target pixel. Seven prediction methods are defined and one predictor is selected for each image. The compression ratio, which depends on the type of image, is about 1/2 to 1/3 in the case of the medical image.

JPEG 2000 applies a discrete wavelet transform (DWT) to an image to transform it into frequency space and performs modeling for the transformed data so as to increase entropy coding efficiency, followed by arithmetic coding process. The compression ratio of JPEG 2000 for a medical image is about 1/3 to 1/4 which is higher than that of lossless JPEG.

JPEG-LS calculates a prediction value of a target pixel from four neighboring pixels of the target pixel and applies Golomb-Rice coding to the prediction error. A prediction method is selected from among three prediction methods for each pixel depending on the value of the target pixel. The compression ratio of JPEG-LS for a medical image is comparable with that of JPEG 2000.

The abovementioned lossless image compression method is an algorithm that performs compression on a per image basis. Nowadays, as a compression method for a medical image, such as a multislice CT/MR image, in which there is a correlation between frames, a method that uses a 3D DWT has been proposed. This method achieves a higher compression ratio than that of the abovementioned method that performs compression on a per image basis.

As a prior art related to the present invention, there is known an image data compression method that compresses a frame image constituting a plurality of slices of tomographic image or moving image (refer to, for example, Patent Document 1: Jpn. Pat. Appln. Laid-Open Publication No. 2005-245922).

The multislice CT/MR image, which is an image obtained by using a sensor provided outside a human body to detect the dosage of X-ray radiation transmitted through a human body or radiation dose from a radioactive substance administered into a human body and reconstructing, e.g., a distribution of X-ray absorption of the human body across a measured cross-section so as to visualize the condition of tissues inside the body, differs largely from a natural image that is obtained by directly photographing a subject.

In particular, the multislice CT/MR image may include noise caused by the sensor and reconstruction process, which does not exist in the natural image in general. Radiated noise caused in multislice CT image is a conspicuous example of the noise.

In the case where a conventional image compression method is used to compress the medical image including such noise that does not exist in a natural image, the compression efficiency becomes lower as compared with the case of the natural image, thus making it difficult to achieve a high image compression ratio.

The natural image has locally a high continuity between pixel values. The above-mentioned problem of difficulty in achieving a high image compression ratio is caused by the fact that the conventional image compression method is based on this feature of the natural image. When the DWT is applied to the natural image, the distribution of pixel values tends to be biased toward low frequency components of frequency space in the transformed data and, as this trend becomes stronger, the compression ratio becomes higher. On the other hand, the medical image including noise contains more high frequency components than the natural image does, so that the degree of the bias in the frequency space becomes small than that in the natural image, resulting in a decrease in a compression ratio.

Further, since the medical image needs to be compressed without image quality degradation, i.e., in a lossless fashion as described above, image processing involving the image quality degradation, such as one that quantizes frequency components to reduce information amount, cannot be applied to the medical image. This makes it difficult to achieve a higher compression ratio of the medical image.

As described above, in view of the sharp increase in the number of multislice images, i.e., the data amount thereof due to the technological advancement in an imaging diagnostic apparatus, there has been a need to compress the multislice image at a higher compression ratio in a lossless fashion.

SUMMARY OF THE INVENTION

The present invention has been made to solve the above problem, and an object thereof is to provide an image compression apparatus, an image compression program, and an image compression method capable of increasing a compression ratio achieved by lossless compression of a 3D image.

To solve the above problem, according to a first aspect of the present invention, there is provided an image compression apparatus that performs lossless compression of a 3D image constituted by a plurality of frames, comprising: an image dividing section that divides the 3D image into a plurality of compression units each of which is a 3D area having a predetermined size; a pixel selection section that sequentially selects pixels in the compression unit as a target pixel in a predetermined order for each compression unit that has been obtained by the image dividing section and selects pixels located within a predetermined range near the target pixel as reference pixels; a prediction error calculation section that calculates a prediction value of the pixel value of the target pixel selected by the pixel selection section based on the pixel values of the reference pixels selected by the pixel selection section and calculates a difference between the prediction value and pixel value of the target pixel selected by the pixel selection section as a prediction error; and an entropy coding section that performs entropy coding of the prediction error calculated by the prediction error calculation section.

In the image compression apparatus according to the present invention, the prediction error calculation section calculates the prediction value of the target pixel by summating values each obtained by multiplying the pixel value of each of the plurality of reference pixels by a weighting factor, the weighting factor being calculated such that the prediction error becomes minimum in each compression unit.

The image compression apparatus according to the present invention further comprises a compressed data output section that outputs information concerning the 3D image, weighting factor calculated by the prediction error calculation section, and result of the entropy coding output by the entropy coding section as compressed data.

The image compression apparatus according to the present invention further comprises a compression condition determination section that determines the number and position of the reference pixels such that the size of the compressed data output by the compressed data output section becomes minimum.

In the image compression apparatus according to the present invention, the compression condition determination section determines the size of the compression unit such that the size of the compressed data output by the compressed data output section becomes minimum.

The image compression apparatus according to the present invention further comprises a decompression section that calculates a prediction value of a target pixel in the same manner as the prediction error calculation section does based on the compressed data output by the compressed data output section, calculates a prediction error of the target pixel by decoding processing corresponding to the entropy coding performed by the entropy coding section, and restore the original pixel value of the target pixel based on the prediction value and prediction error of the target pixel.

In the image compression apparatus according to the present invention, the image dividing section compares pixel values of the same positions in the frames that constitute the image to detect an area to be excluded from a compression target, and the pixel selection section selects the target pixel and reference pixels from among pixels other than the detected area.

In the image compression apparatus according to the present invention, the pixel selection section selects pixels located within a predetermined range near the target pixel in the same frame as that includes the target pixel and further selects pixels located within a predetermined range near the pixel at the same positions as the target pixel across frames within a predetermined range near the frame including the target pixel.

In the image compression apparatus according to the present invention, the pixel selection section selects the reference pixels starting from a pixel nearest to the target pixel until the number of the reference pixels reaches a predetermined number.

In the image compression apparatus according to the present invention, the 3D image is an image in which there is a correlation between adjacent frames.

According to a second aspect of the present invention, there is provided an image compression program allowing a computer to execute lossless compression of a 3D image constituted by a plurality of frames, comprising: an image dividing step that divides the 3D image into a plurality of compression units each of which is a 3D area having a predetermined size; a pixel selection step that sequentially selects pixels in the compression unit as a target pixel in a predetermined order for each compression unit that has been obtained by the image dividing step and selects pixels located within a predetermined range near the target pixel as reference pixels; a prediction error calculation step that calculates a prediction value of the pixel value of the target pixel selected by the pixel selection step based on the pixel values of the reference pixels selected by the pixel selection step and calculates a difference between the prediction value and pixel value of the target pixel selected by the pixel selection step as a prediction error; and an entropy coding step that performs entropy coding of the prediction error calculated by the prediction error calculation step.

In the image compression program according to the present invention, the prediction error calculation step calculates the prediction value of the target pixel by summating values each obtained by multiplying the pixel value of each of the plurality of reference pixels by a weighting factor, the weighting factor being calculated such that the prediction error becomes minimum in each compression unit.

The image compression program according to the present invention further comprises, after the entropy coding step, a compressed data output step that outputs information concerning the 3D image, weighting factor calculated by the prediction error calculation step, and result of the entropy coding output by the entropy coding step as compressed data.

The image compression program according to the present invention further comprises, before the image dividing step, a compression condition determination step that determines the number and position of the reference pixels such that the size of the compressed data output by the compressed data output step becomes minimum.

In the image compression program according to the present invention, the compression condition determination step determines the size of the compression unit such that the size of the compressed data output by the compressed data output step becomes minimum.

The image compression program according to the present invention further comprises a decompression step that calculates a prediction value of a target pixel in the same manner as the prediction error calculation step does based on the compressed data output by the compressed data output step, calculates a prediction error of the target pixel by decoding processing corresponding to the entropy coding performed by the entropy coding step, and restore the original pixel value of the target pixel based on the prediction value and prediction error of the target pixel.

In the image compression program according to the present invention, the image dividing step compares pixel values of the same positions in the frames that constitute the image to detect an area to be excluded from a compression target, and the pixel selection step selects the target pixel and reference pixels from among pixels other than the detected area.

In the image compression program according to the present invention, the pixel selection step selects pixels located within a predetermined range near the target pixel in the same frame as that includes the target pixel and further selects pixels located within a predetermined range near the pixel at the same positions as the target pixel across frames within a predetermined range near the frame including the target pixel.

In the image compression program according to the present invention, the pixel selection step selects the reference pixels starting from a pixel nearest to the target pixel until the number of the reference pixels reaches a predetermined number.

According to a third aspect of the present invention, there is provided an image compression method that performs lossless compression of a 3D image constituted by a plurality of frames, comprising: an image dividing step that divides the 3D image into a plurality of compression units each of which is a 3D area having a predetermined size; a pixel selection step that sequentially selects pixels in the compression unit as a target pixel in a predetermined order for each compression unit that has been obtained by the image dividing step and selects pixels located within a predetermined range near the target pixel as reference pixels; a prediction error calculation step that calculates a prediction value of the pixel value of the target pixel selected by the pixel selection step based on the pixel values of the reference pixels selected by the pixel selection step and calculates a difference between the prediction value and pixel value of the target pixel selected by the pixel selection step as a prediction error; and an entropy coding step that performs entropy coding of the prediction error calculated by the prediction error calculation step.

According to the present invention, a compression ratio achieved by lossless compression of a 3D image can be increased.

BRIEF DESCRIPTION OF THE DRAWINGS

FIG. 6 is a formula for calculating a prediction value in the intraframe coding processing according to the embodiment;

FIG. 7 is a formula for calculating a prediction error in the intraframe coding processing according to the embodiment;

FIG. 8 is a formula for calculating an error evaluation value in the intraframe coding processing according to the embodiment;

FIG. 9 is a view showing an example of selection of reference pixels in interframe coding processing according to the embodiment;

FIG. 10 is a formula for calculating the prediction value in the interframe coding processing according to the embodiment;

FIG. 11 is a formula for calculating the prediction error in the interframe coding processing according to the embodiment;

FIG. 12 is a formula for calculating the error evaluation value in the interframe coding processing according to the embodiment;

FIG. 15 is a flowchart showing an example of operation of decompression processing performed by the image compression apparatus according to the embodiment.

DETAILED DESCRIPTION OF THE PREFERRED EMBODIMENTS

Figure 1:
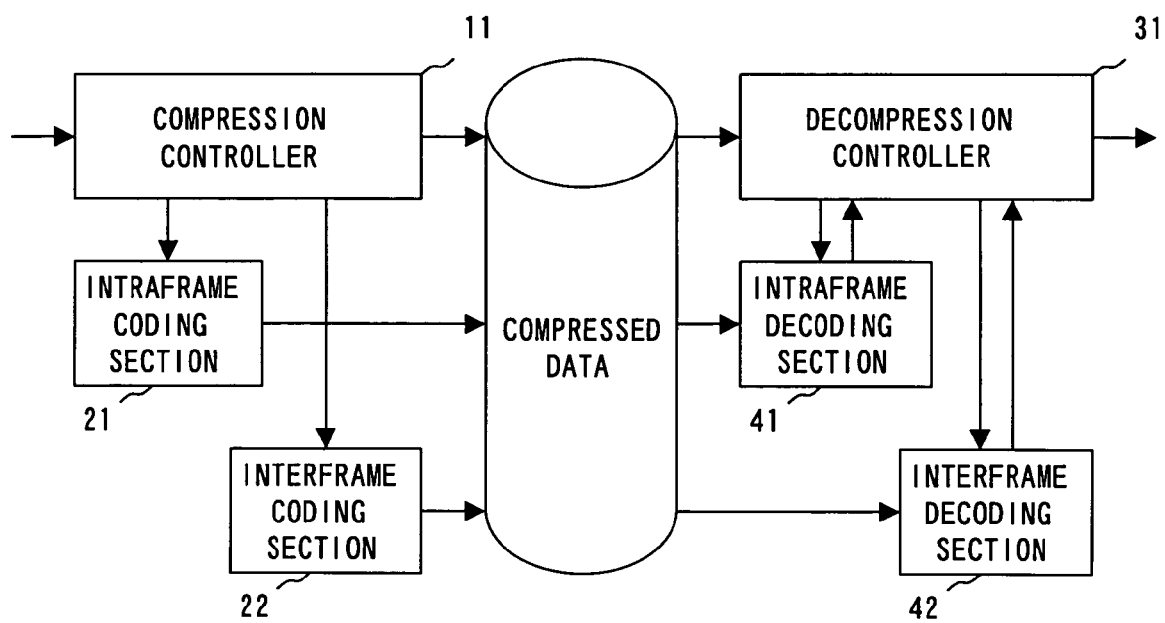
FIG. 1 is a block diagram showing an example of a configuration of an image compression apparatus according to an embodiment of the present invention.

An embodiment of the present invention will be described below with reference to the accompanying drawings.

An image compression apparatus according to an embodiment of the present invention is featured in that a multislice image constituted by a plurality of frames is divided into groups each having a predetermined number of frames, each frame is divided into blocks, pixels included in [block vertical size×block horizontal size×frame number in each group] are set as a compression unit, and prediction of the value of a target pixel is made such that the entropy of the total prediction error of each pixel in the compression unit becomes minimum.

Further, in the image compression apparatus, the same prediction is applied to the same block positions in a plurality of frames. This allows the regularity of a local change of noise included in a multislice image and continuity or similarity of pixel values between frames to be reflected in the prediction of the pixel value. Thus, the prediction accuracy can be improved to allow the prediction error values to be concentrated near 0, resulting in an improvement of the entropy coding efficiency.

In a CT imaging apparatus, an X-ray source disposed opposite to a human body and a detector for detecting X-radiation are rotated in a spiral manner, and a difference in an X-ray absorption between various sites of the human body is visualized as brightness value based on the X-ray transmission detected by the detector. Since the CT imaging apparatus performs scanning while being rotated, a circular imaging area is obtained. The exterior of the circular imaging area is out of imaging area, so that it has a uniform value (e.g., 0).

In a multislice image, the above exterior area exists across all frames at the same position. The image compression apparatus detects the area in which the same pixel value continues across a plurality of frames to thereby exclude the detected area from a compression area while outputting area information to thereby reduce the number of pixels to be compressed and increase the compression efficiency.

Further, the image compression apparatus selects reference pixels to be used for the prediction of a target pixel value from among pixels that are located near the target pixel and therefore has a high correlation with the target pixel to thereby improve the prediction accuracy. Since the positions of the reference pixels need to be capable of being referred to at decompression time, the reference pixels must be selected from among the pixels that have already been compressed (or decompressed, in the case of decompression processing). In the case where the image compression apparatus performs compression according to the raster scan order, the reference pixels are selected from among the pixels that precede the target pixel in terms of the raster scan order.

Further, the image compression apparatus sets a weight for the pixel values of the reference pixels and summates the values each obtained by multiplying the pixel value of each reference pixel and its weight to thereby calculate the prediction value of the target pixel. Further, the image compression apparatus uses a set of weights for each compression unit described above and determines the weight such that the prediction error which is a difference between each target pixel value in the compression unit and the prediction value thereof becomes minimum. This allows local continuity or similarity of images and continuity or similarity of pixel values between frames to be reflected on the prediction, thereby increasing the compression ratio.

Since there is similarity of images or continuity of pixel values between an image of a current frame including the target pixel and a preceding frame, the pixel in the preceding frame nearer to the same position as the target pixel is expected to have a higher correlation with the target pixel. Therefore, by using the pixels in the preceding frame for the prediction in addition to the reference pixels, the prediction accuracy can be expected to be further increased. Since the preceding frame has been compressed/decompressed before the frame including the target pixel, the positions of the reference pixels are arbitrarily selected. However, it is preferable to select the reference pixels in the preceding frame from among the pixels near the same position as the target pixel in the descending order in terms of a correlation with the target pixel.

It is necessary to store the weight values of the reference pixels in addition to the coded data obtained by entropy coding the prediction error, and the image compression apparatus assigns a predetermined number of bits for representing the weight values. Accordingly, by determining the number of reference pixels such that the total of the number of bits obtained by multiplying the number of bits assigned to the weight with the number of weights (=number of reference pixels) and the size of the compressed data obtained by entropy coding the prediction error becomes minimum, the compression efficiency becomes highest.

Further, a pixel nearer to the target pixel has a higher correlation with the target pixel and is therefore suitably used for the prediction. Therefore, the image compression apparatus preferentially selects the pixels near the target pixel to thereby improve the prediction accuracy.

A configuration of the image compression apparatus according to the present embodiment will next be described.

FIG. 1 is a block diagram showing an example of a configuration of the image compression apparatus according to the present embodiment. The image compression apparatus includes: a compression controller 11, an intraframe coding section 21, and an interframe coding section 22, which are components for compression processing that generates compressed data from a muiltislice image (3D image); and a decompression controller 31, an intraframe decoding section 41, and an interframe decoding section 42, which are components for decompressing processing that generates an original multislice image from a compressed data.

Operation of the compression processing performed in the image compression apparatus according to the present embodiment will next be described.

The compression controller 11 previously performs compression condition determination processing to thereby determine compression conditions for minimizing the size of data to be compressed and then performs compression processing using the determined compression conditions. The details of the compression condition determination processing will be described later.

Figure 2:
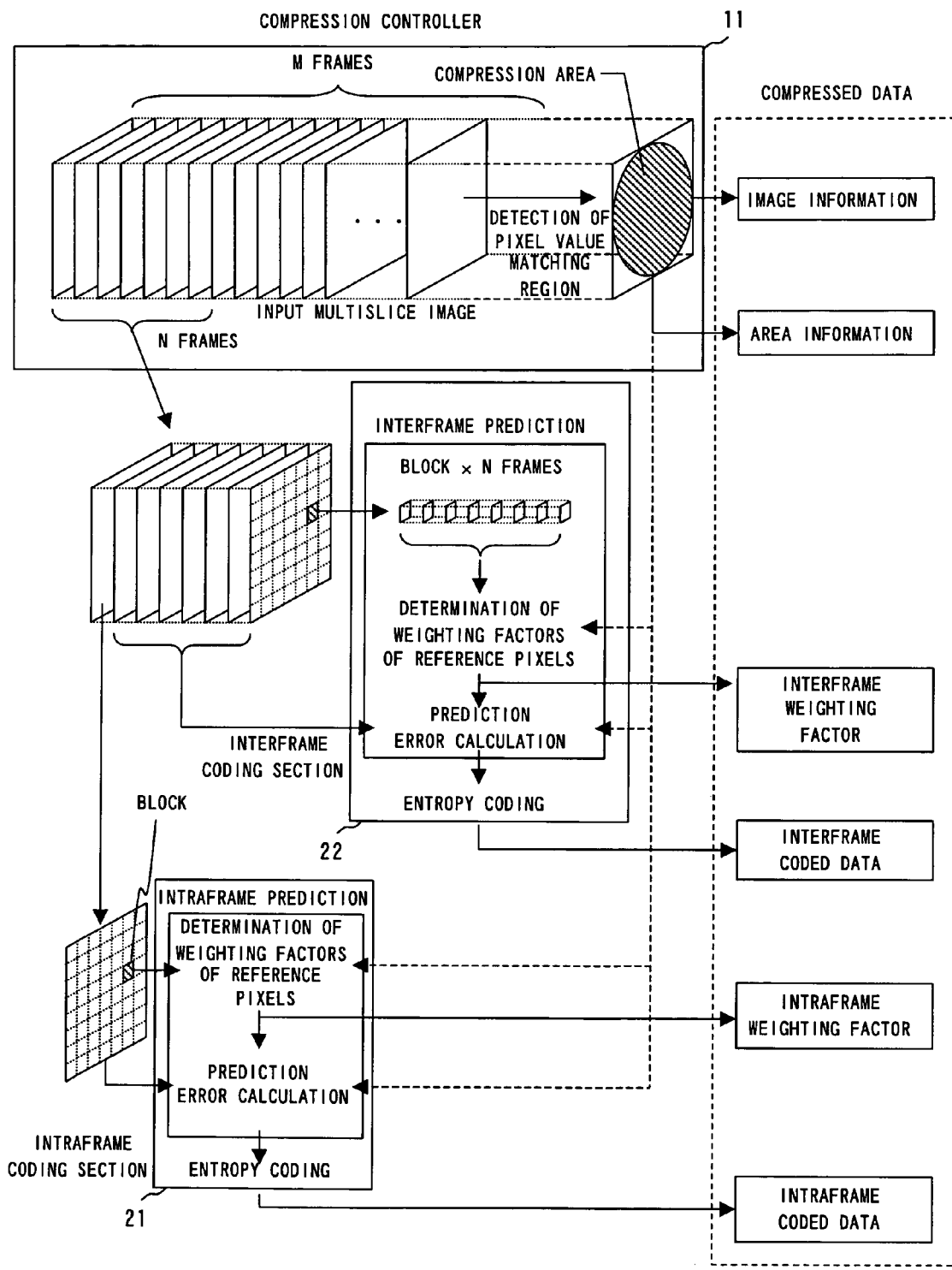
FIG. 2 is a block diagram showing an example of operation of compression processing performed in the image compression apparatus according to the embodiment.

FIG. 2 is a block diagram showing an example of operation of the compression processing performed in the image compression apparatus according to the present embodiment. The compression controller 11 acquires image information and area information from an input multislice image and outputs them to compressed data. Further, the compression controller 11 divides frames of the multislice image into a plurality of groups, outputs a first frame of the group to the intraframe coding section 21, and outputs the group to the interframe coding section 22. The intraframe coding section 21 performs, as intraframe coding processing, intraframe prediction and entropy coding for each block in the first frame and outputs its results to the compressed data as an intraframe weighting factor and intraframe coded data. The interframe coding section 22 performs, as interframe coding processing, interframe prediction and entropy coding for each block in the frames of the group and outputs its results to the compressed data as an interframe weighting factor and interframe coded data.

Figure 3:
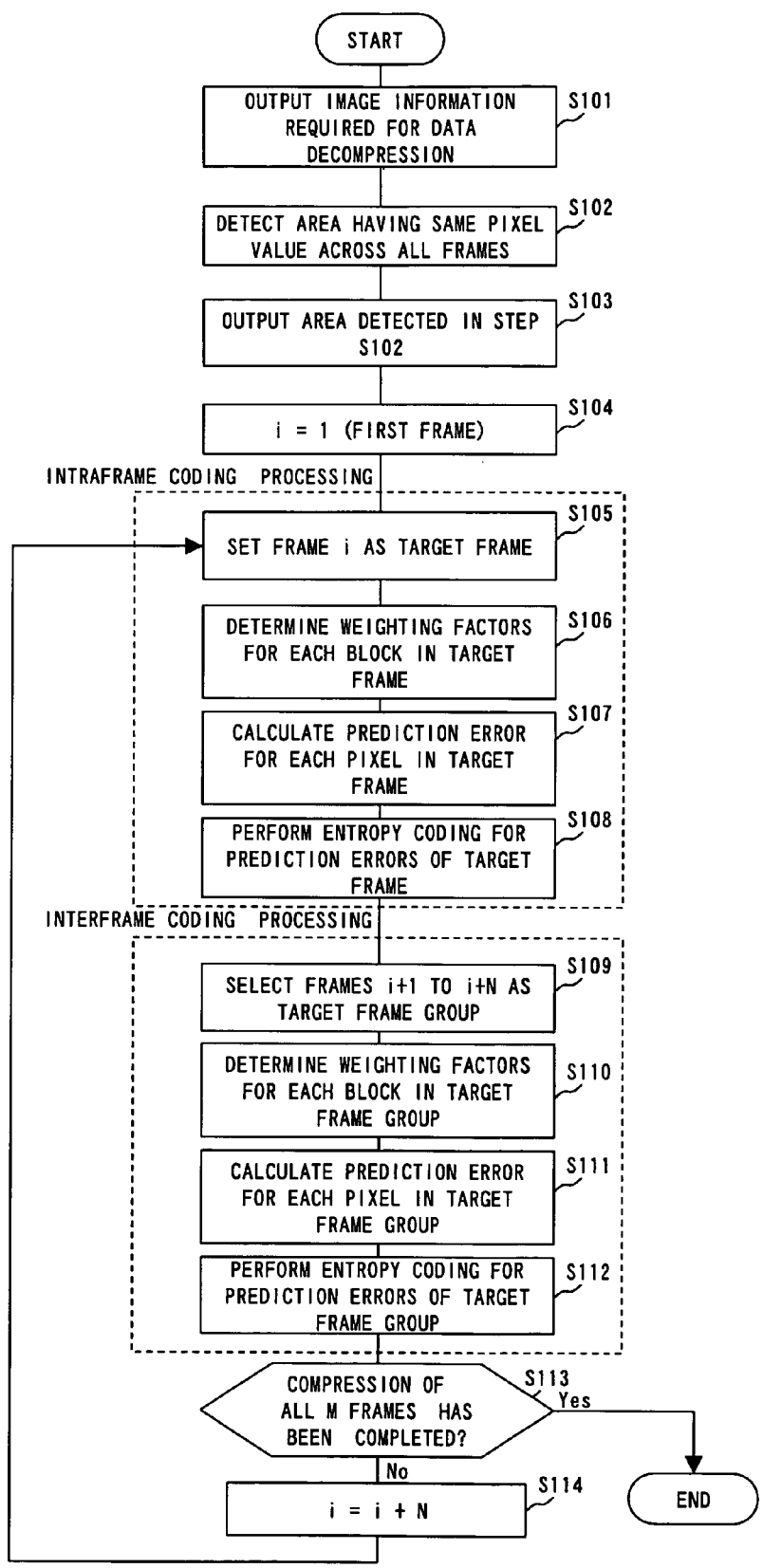
FIG. 3 is a flowchart showing an example of operation of the compression processing performed in the image compression apparatus according to the embodiment.

FIG. 3 is a flowchart showing an example of operation of the compression processing performed in the image compression apparatus according to the present embodiment. The compression controller 11 outputs, as image information concerning an input multislice image, the horizontal and vertical size (number of pixels) of each frame, total frame number M, frame number N in each group, block size (block vertical pixel number×block horizontal pixel number) K×K in each frame to the compressed data (S101). The above image information is required for data decompression. Although the block vertical pixel number and block horizontal pixel number are set equal to each other, they may differ from each other.

The compression controller 11 then detects the area having the same pixel value across all M frames of the input multislice image. In the case of, e.g., a CT image, the exterior portion of a circular area which is scanned area is detected in general. The compression controller 11 then sets the pixels in the detected area as a non-compression area for which coding processing is not performed, and sets the remaining area as a compression area for which coding processing is performed (S102). The non-compression area may be determined in units of a group. In this case, the non-compression area is defined as the area having the same pixel value across all N frames.

Subsequently, the compression controller 11 outputs the area information detected in step S102 to the compressed data (S103). At this time, the compression controller 11 compresses the area information as much as possible. For example, assuming that the compression area has a circular shape, the compression controller 11 outputs the circle center position and radial pixel number to the compressed data; assuming that the compression area has a rectangular shape, the compression controller 11 outputs the position of the upper left corner of the rectangle, vertical pixel number, and horizontal pixel number to the compressed data. Further, for the compression area having an arbitrary shape, the compression controller 11 sets the inner area of the interior of the compression area as "0" and sets the exterior thereof as "1" and performs coding of the run length of 0's and 1's.

The compression controller 11 then sets the compression starting position to the first frame (frame number i=1) (S104).

The following steps S105 to S108 describe intraframe coding processing performed by the intraframe coding section 21.

The compression controller 11 acquires N frames (first frame=i) from M frames and sets the N frames as a target group. The intraframe coding section 21 selects a frame i as a target frame (S105).

Figure 4:
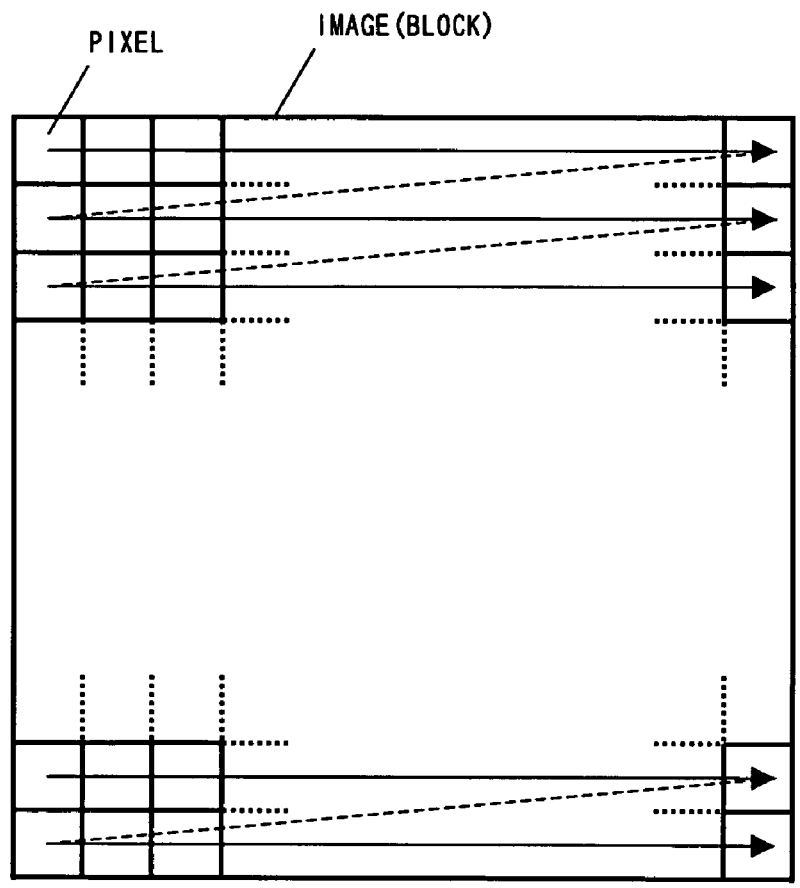
FIG. 4 is a view showing an example of the raster scan order according to the embodiment.

Then, the intraframe coding section 21 determines weighting factors of reference pixels for each block in the target frame such that a difference between the pixel value of target pixel and prediction error thereof becomes minimum (S106). More specifically, the intraframe coding section 21 selects a block within the compression area as a target block, sequentially selects target pixels in the target block according to the raster scan order, and determines the weighting factors of the reference pixels for each target block. FIG. 4 is a view showing an example of the raster scan order according to the present embodiment. As shown in FIG. 4, the intraframe coding section 21 sequentially selects the pixels in the block as a target pixel one by one starting from the uppermost line to the lowermost line.

Figure 5:
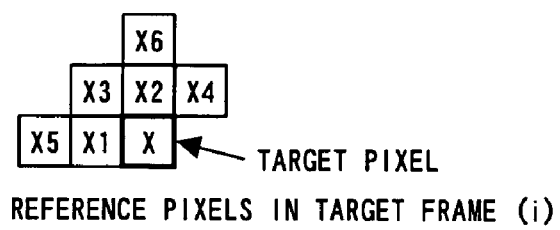
FIG. 5 is a view showing an example of selection of reference pixels in intraframe coding processing according to the embodiment.

FIG. 5 is a view showing an example of selection of reference pixels in the intraframe coding processing according to the present embodiment. Assuming that each pixel has a scan number according to the scan order, a predetermined number of pixels near the target pixel are selected as reference pixels from among the pixels having smaller number than that of the target pixel within the compression area. It is assumed that pixel value of the target pixel is X, number of reference pixels is R, and pixel values of the R reference pixels selected for the target pixel are X1 to XR. In FIG. 5, the number of reference pixels R is set to 6.

As an example of a weighting factor determination method, there is known a method that uses a multiple regression analysis or least-square method. Assuming that prediction value of the target pixel is P, weighting factors of the reference pixels are W1 to WR, prediction error is E, evaluation value of the prediction error is e, number of the pixels in each block is F (F=K×K), values of F pixels in each block are X1 to XF, and constant term of the prediction value is C, a relationship between the parameters can be represented by the formulas shown in FIGS. 6 to 8. FIG. 6 is a formula for calculating the prediction value in the intraframe coding processing according to the present embodiment. FIG. 7 is a formula for calculating the prediction error in the intraframe coding processing according to the present embodiment. FIG. 8 is a formula for calculating the error evaluation value in the intraframe coding processing according to the present embodiment.

The intraframe coding section 21 uses F pixels in each block of the target frame and formula shown in FIG. 8 to calculate e and then calculates weighting factors W1 to WR and constant term C such that e becomes minimum. The constant term C may be set to 0 for reduction in the number of parameters. Then, the intraframe coding section 21 outputs the determined weighting factors W1 to WR to the compressed data as intraframe weighting factors. The bit accuracy for representing the weighting factor is previously determined such that a calculation error made at the calculation time of the prediction value falls within a predetermined range.

Then, the intraframe coding section 21 sequentially selects pixels in the target frame as a target pixel, calculates the prediction value based on the weighting factors obtained in step S106 and values of the reference pixels according to the formula shown in FIG. 6, and calculates the prediction error between the prediction value and the original pixel value of the target pixel according to the formula shown in FIG. 7 (S107). The intraframe coding section 21 then obtains a block including the target pixel as a target block based on the position of the target pixel for which the prediction value is calculated and selects the weighting factors (that have been determined in step S106) corresponding to the target block.

The intraframe coding section 21 performs entropy coding for the prediction errors of the target frame calculated in step S107 (S108). The distribution of the prediction errors concentrates near 0, so that Golomb-Rice coding is suitably used as the entropy coding. Other coding methods such as Huffman coding or arithmetic coding may be applied. Then, the intraframe coding section 21 outputs a result of the entropy coding to the compressed data as intraframe coded data.

The following steps S109 to S112 describe interframe coding processing performed by the interframe coding section 22.

The interframe coding section 22 selects all frames in the target group except for frame i (i.e., frames i+1 to i+N) as a target frame group (S109). If the number of frames that have not yet been coded does not reach N, the interframe coding section 22 selects remaining all frames as a target frame group.

The interframe coding section 22 then determines the weighting factors of the reference pixels for each block in the target frame group (S110). The determination method of the weighting factors is the same as that in the case of the intraframe coding processing except for the following points: target pixel is selected in the target block at the same positions in respective frames of the target frame group; assuming that the frame including the target pixel is a target frame and that the frame number of the target frame is j, reference pixels are selected from a predetermined range in the target frame (j) and immediately preceding frame (j−1); and pixels used for the calculation of the error evaluation value e exist across N frames (=target group). The target pixels are sequentially selected in the same target block in respective frames of the target frame group according to the raster scan order.

FIG. 9 is a view showing an example of selection of reference pixels in the interframe coding processing according to the present embodiment. A predetermined number of pixels near the target pixel are selected as reference pixels from among the pixels having smaller number than the target pixel and further a pixel located in the same position as the target pixel in the immediately preceding frame and its neighboring pixels are selected. As in the case of the intraframe coding processing, it is assumed that pixel value of the target pixel is X, number of reference pixels is S, and pixel values of the S reference pixels selected for the target pixel are X1 to XS. In FIG. 9, the number of reference pixels S is set to 11. Further, FIG. 9 represents the positions of the reference pixels in the current frame (j) including the target pixel and immediately preceding frame (j−1).

Assuming that prediction value of the target pixel is P, weighting factors of the reference pixels are W1 to WS, prediction error is E, evaluation value of the prediction error is e, number of the pixels in each compression unit is G (G=K×K×N), values of G pixels in each compression unit are X1 to XG, and constant term of the prediction value is C, a relationship between the parameters can be represented by the formulas shown in FIGS. 10 to 12. FIG. 10 is a formula for calculating the prediction value in the interframe coding processing according to the present embodiment. FIG. 11 is a formula for calculating the prediction error in the interframe coding processing according to the present embodiment. FIG.

12 is a formula for calculating the error evaluation value in the interframe coding processing according to the present embodiment.

The interframe coding section 22 uses G pixels in each compression unit of the target frame and formula shown in FIG. 12 to calculate e and then calculates weighting factors W1 to WS and constant term C such that e becomes minimum. The constant term C may be set to 0 for reduction in the number of parameters. Then, the interframe coding section 22 outputs the determined weighting factors W1 to WS to the compressed data as interframe weighting factors.

Then, the interframe coding section 22 calculates the prediction value from the weighting factors obtained in step S110 and values of the reference pixels according to the formula shown in FIG. 10 for each pixel in the target frame group and then calculates the prediction error between the prediction value and original pixel value of the target pixel according to the formula shown in FIG. 11 (S111). The target pixels are sequentially selected according to the raster scan order as in the case of the intraframe coding processing. The interframe coding section 22 then obtains a block including the target pixel as a target block based on the position of the target pixel for which the prediction value is calculated and selects the weighting factors (that have been determined in step S110) corresponding to the target block.

The interframe coding section 22 performs entropy coding for the prediction errors of the target frame group calculated in step S111 (S112). Although Golomb-Rice coding is suitably used as the entropy coding as in the case of the intraframe coding processing, other coding methods such as Huffman coding or arithmetic coding may be applied. Then, the interframe coding section 22 outputs a result of the entropy coding to the compressed data as interframe coded data.

The abovementioned intraframe coding processing and interframe coding processing are performed for each target group. Further, each step of the intraframe coding processing and interframe coding processing are performed in units of a compression unit which is a 3D area obtained by dividing the target group into blocks, so that correlation between pixels in the compression unit is high, thereby achieving a high compression efficiency.

If the coding of all M frames has been completed (Y in S113), the compression controller 11 ends the compression processing; if there remains any frame that has not been coded (N in S113), the compression controller 11 proceeds to step S114.

The compression controller 11 then adds N to the variable representing frame number for next selection of the first frame to be coded (S114) and returns to step S105.

By repeating the processing of steps S105 to S114 according to the abovementioned flow until the compression processing of all frames has been completed, the input multislice medical images constituted by M frames is compressed.

Figure 13:
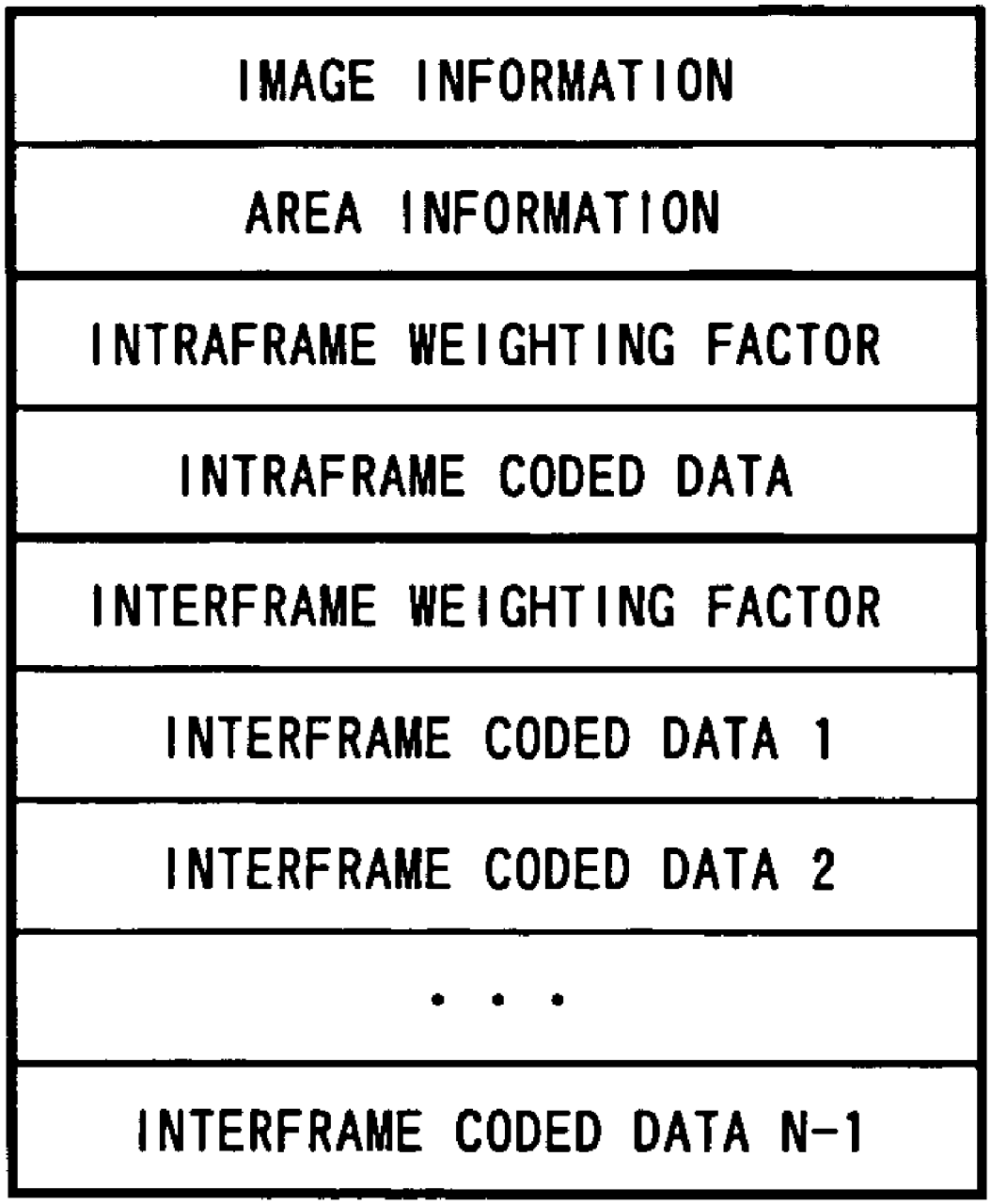
FIG. 13 is a view showing an example of a configuration of compressed data according to the embodiment.

FIG. 13 is a view showing an example of a configuration of the compressed data according to the present embodiment. This figure shows compressed data output as a result of the compression processing. The compressed data includes, in addition to the abovementioned image information and area information, intraframe weighting factor and intraframe coded data obtained by the intraframe coding processing, and interframe weighting factor and interframe coded data obtained by the interframe coding processing. The intraframe weighting factor, intraframe coded data, interframe weighting factor, and interframe coded data are stored in groups.

Although the intraframe coding processing in the present embodiment is performed in the same manner as the interframe coding processing, another lossless compression processing for 2D image may be applied as the intraframe coding processing.

Further, although the compression processing is performed according to the frame number and the reference pixels are selected from the current frame and immediately preceding frame in the interframe coding processing, the compression processing may be performed not according to the frame number but, e.g., in the forward and backward directions of the frame number. In this case, the reference pixels may be selected according to the directions. Further, reference pixels may be selected not only from the immediately adjacent frame, but also from the frame two or more before or after the current frame depending on the strength of the correlation between frames.

Next, compression condition determination processing will be described.

Figure 14:
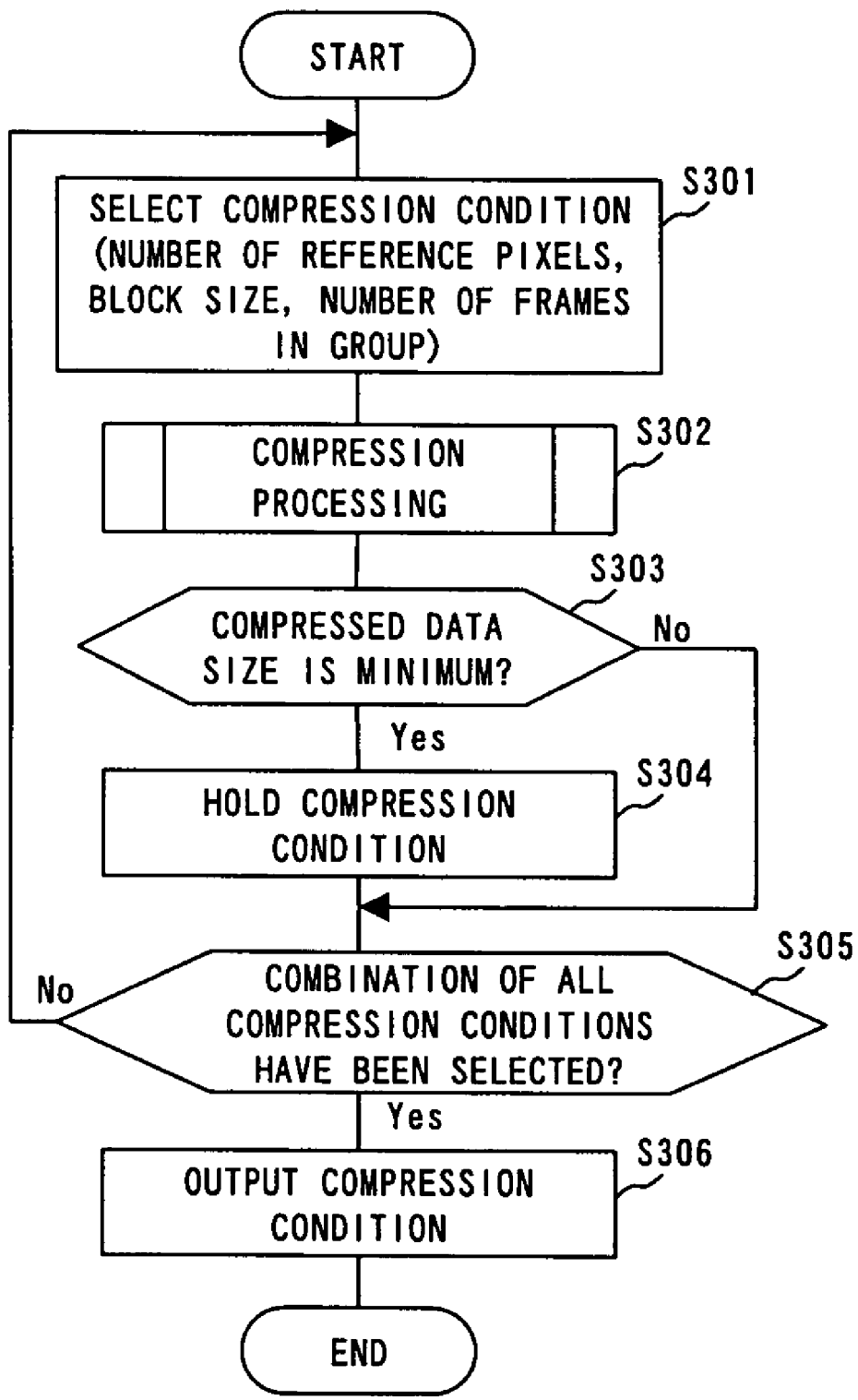
FIG. 14 is a flowchart showing an example of operation of compression condition determination processing performed by the image compression apparatus according to the embodiment.

FIG. 14 is a flowchart showing an example of operation of compression condition determination processing performed by the image compression apparatus according to the present embodiment. The compression controller 11 selects a first compression condition from compression conditions (S301). The compression condition is a combination of the following three parameters.

Parameter 1: number and position of reference pixels (used in steps S106 and S110)

Parameter 2: block size in frame (used in steps S106 and S110)

Parameter 3: number of frames in group (used in step S101)

For example, the compression controller 11 selects a combination of parameters 1 and 2 as the compression condition used in the intraframe coding processing and selects a combination of parameters 1, 2, and 3 as the compression condition used in the interframe coding processing. The compression controller 11 changes the value of each parameter within a predetermined range to thereby obtain an optimum value.

For parameter 1, the compression controller 11 sequentially selects the reference pixels according to a predetermined order starting from the frame nearest to the target pixel to thereby obtain the optimum value of the number of reference pixels. For parameter 2, the compression controller 11 gradually increases the block size from a smaller number to thereby obtain the optimum value of the block size. For parameter 3, the compression controller 11 gradually increases the number of frames in a group from a smaller number to thereby obtain the optimum value of the number of frames in a group.

The compression controller 11 performs compression processing for an image to be evaluated using the compression condition selected in step S301 (S302). The compression controller 11 then determines whether the size of the compressed data is the minimum of the size of the compressed data that have been obtained by the compression processing using the previous conditions. If the data size is the minimum, (Y in S303), the compression controller 11 proceeds to step S304; otherwise (N in S303), the compression controller 11 proceeds to step S305.

Then, the compression controller 11 holds the compression condition used in the compression processing of step S302 (S304). That is, the compression condition with which the compressed data size becomes minimum among all previous compression conditions is held.

Then, the compression controller 11 determines whether all compression conditions have been used to perform compression processing. If all conditions have been used for the compression processing (Y in S305), the compression controller 11 proceeds to step S306; otherwise (N in S305), the compression controller 11 returns to step S301. In step S301, the compression controller 11 selects another combination of conditions and uses it to perform step S302 and subsequent steps.

The compression controller 11 outputs the compression condition selected in steps S301 to S305, with which the compressed data size becomes minimum, as an optimum compression condition (S306). Afterward, this optimum compression condition is used for the compression processing.

The compression condition obtained by the abovementioned compression condition determination processing is the optimum condition for an image to be evaluated. Accordingly, this condition can be expected to be nearly optimum compression condition for an image of the same type. In the case where compression processing needs to be performed using the optimum compression condition for each input multislice image, the compression condition determination processing should be performed for an input multislice image. In this case, compression data is held in step S304, and not compression condition but the compressed data is output in step S306. With this configuration, it is possible to output compression data that has been compressed by using the optimum compression condition for each input image.

Next, operation of decompression processing performed in the image compression apparatus according to the present embodiment will be described.

FIG. 15 is a flowchart showing an example of operation of decompression processing performed by the image compression apparatus according to the present embodiment. The decompression controller 31 acquires, from the image information of the compressed data, the horizontal and vertical pixel number of an input image, total frame number M, divided frame number N, block size K×K pixels (S201). The decompression controller 31 then acquires a compression area from the area information of the compressed data. If the area information has been coded, the decompression controller 31 decodes it (S202).

The following steps S203 to S205 describes intraframe decoding processing performed by the intraframe decoding section 41.

The intraframe decoding section 41 determines a target frame as in the case of the compression processing and acquires, from the compressed data, the intraframe weighting factors W1 to WR for each block (S203). A set of weighting factors W1 to WR is stored for each block. In this example, the number of reference pixels R is set to 6, as in the case of the example of the compression processing.

The intraframe decoding section 41 decodes the prediction errors of the target frame that have been entropy coded (S204).

The intraframe decoding section 41 scans the prediction errors that have been decoded in step S204 in the abovementioned raster scan order, uses the weighting factors acquired in step S203 to calculate the prediction value P according to the formula shown in FIG. 6, and adds the prediction value P to the prediction errors to restore an original pixel value (S205).

The following steps S206 to S208 describe interframe decoding processing performed by the interframe decoding section 42.

The interframe decoding section 42 determines a target frame group as in the case of the compression processing, and acquires the interframe weighting factors W1 to WS from the compressed data. A set of weighting factors W1 to WS is stored for each block. In this example, the number of reference pixels S is set to 11, as in the case of the example of the compression processing (S206).

Then, the interframe decoding section 42 decodes the interframe coded data to acquire the entropy coded prediction errors. In this case, prediction errors corresponding to N−1 frames which is the target frame group are decoded (S207).

The interframe decoding section 42 then scans the prediction errors of each target frame group that have been decoded in step S207 in the abovementioned raster scan order, uses the weighting factors acquired in step S203 to calculate the prediction value P according to the formula shown in FIG. 10, and adds the prediction value P to the prediction errors to restore an original pixel value (S208).

If the decompression processing of all M frames has been completed (Y in S209), the decompression controller 31 ends this flow; if there remains any frame that has not been decompressed (N in S209), the decompression controller 31 returns to step S203. By repeating the processing of steps S203 to S209 until the decoding processing of all M frames has been completed, the original multislice medical images constituted by M frames is restored.

Although the image compression apparatus according to the present embodiment has been applied to compress the multislice CT/MR image which is a 3D image in which 2D images (xy planes) are arranged in the depth direction (Z-axis direction), it may be applied to compress a 3D image in which 2D images (xy coordinate) are arranged in the time direction (t coordinate). That is, when the image compression apparatus according to the present embodiment is used to compress a 3D image including a frame group constituted by 2D image frames in which there is a predetermined correlation between a given frame and its neighboring frame, the advantage of the present invention can be obtained.

The image compression apparatus may be constituted by the compression controller 11, intraframe coding section 21, and interframe coding section 22. In this case, an image decompression apparatus constituted by the decompression controller 31, intraframe decoding section 41, and interframe decoding section 42 may be provided.

As described above, according to the compression and decompression processing according to the present embodiment, it is possible to achieve a higher 3D image compression ratio than that achieved by a lossless compression method using a conventional 3D DWT. That is, it is possible to reduce the storage capacity for storing image data as compared to the conventional lossless compression method, contributing to an increase in the number of images to be stored and reduction in cost of a storage apparatus for storing images.

The image compression apparatus according to the present embodiment can easily be applied to an image processing apparatus to improve the performance thereof. Examples of the image processing apparatus include an information processing apparatus such as a PC (Personal Computer) or server that executes an image processing software application, an imaging diagnostic apparatus such as a CT or MR, an image pickup apparatus such as a digital still camera or video camera, and the like.

Further, it is possible to provide a program that allows a computer constituting the image compression apparatus to execute the above steps as an image compression program. By storing the above program in a computer-readable storage medium, it is possible to allow the computer constituting the image compression apparatus to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; and another computer and database thereof.

An image dividing section and compression condition determination section correspond to the compression controller 11 mentioned in the embodiment. A pixel selection section, a prediction error calculation section, an entropy coding section correspond to the interframe coding section 22 or intraframe coding section 21 mentioned in the embodiment. A compressed data output section corresponds to the compression controller 11, intraframe coding section 21, and interframe coding section 22 mentioned in the embodiment. A decompressing section corresponds to the decompression controller 31, intraframe decoding section 41, and interframe decoding section 42 mentioned in the embodiment.

An image dividing step corresponds to steps S101, S102, and S104 mentioned in the embodiment. An image selection step corresponds to steps S106 and S110 mentioned in the embodiment. A prediction error calculation step corresponds to steps S106, S107, S110, and S111 mentioned in the embodiment. An entropy coding step corresponds to steps S108 and S112 mentioned in the embodiment. A compressed data output step corresponds to steps S101, S103, S106, S108, S110, and S112. A compression condition determination step corresponds to the compression condition determination processing mentioned in the embodiment. A decompression step corresponds to the decompression processing mentioned in the embodiment.

What is claimed is:

1. An image compression apparatus that performs lossless compression of 3D image data, comprising:
    an image dividing section that divides the 3D image data into a plurality of units of data, the 3D image data being composed of a plurality of frames which are respectively images of cross sections at an interval of a predetermined distance, each of the plurality of units having N blocks with N being an integer, the N blocks being respectively located at the same positions in N frames among the plurality of frames;
    a pixel selection section that sequentially selects a pixel in one of the plurality of units as a target pixel in a predetermined order and selects pixels located within a predetermined range near the target pixel as reference pixels;
    a prediction error calculation section that calculates a prediction value of a target pixel value which is a pixel value of the target pixel, according to the pixel values of the reference pixels and calculates a prediction error which is a difference between the prediction value and the target pixel value; and
    an entropy coding section that performs entropy coding of the prediction error in each of the plurality of units.

2. The image compression apparatus according to claim 1, wherein
    the prediction error calculation section calculates the prediction value of the target pixel by summating values each obtained by multiplying each of the pixel values of the reference pixels by each of a weighting factors, and calculates the plurality of weighting factors in order to minimize the prediction error in each of the plurality of units.

3. The image compression apparatus according to claim 2, further comprising a compressed data output section that outputs compressed data which includes information concerning the 3D image data, the plurality of weighting factors, and the result of the entropy coding.

4. The image compression apparatus according to claim 3, further comprising a compression condition determination section that determines the number of the reference pixels and the positions of the reference pixels in order to minimize size of the compressed data.

5. The image compression apparatus according to claim 4, wherein
    the compression condition determination section determines at least N or size of each of the N blocks in order to minimize the size of the compressed data.

6. The image compression apparatus according to claim 3, further comprising a decompression section that acquires the plurality of weighting factors from the compressed data, decodes the compressed data to the prediction error by decoding processing corresponding to the entropy coding, and restores a pixel value of the target pixel based on the plurality of weighting factors and the decoded prediction error.

7. The image compression apparatus according to claim 1, wherein
    the image dividing section compares pixel values at the same positions in the frames that constitute the image to detect an area to be excluded from a compression target, and
    the pixel selection section selects the target pixel and the reference pixels from among pixels in other than the detected area.

8. The image compression apparatus according to claim 1, wherein
    the reference pixels include pixels located within a predetermined range near the target pixel in a frame including the target pixel, and include a pixel located within a second predetermined range near a pixel at the same position as the target pixel in another frame within a predetermined range near the frame including the target pixel.

9. The image compression apparatus according to claim 1, wherein
    the pixel selection section selects the reference pixels starting from a pixel nearest to the target pixel until the number of the reference pixels reaches a predetermined number.

10. The image compression apparatus according to claim 1, wherein
    adjacent frames among the plurality of frames have a correlation.

11. A computer readable medium storing an image compression program that causes a computer to execute a process for lossless compression of 3D image data, the process comprising:
    dividing the 3D image data into a plurality of units of data, the 3D image data being composed of a plurality of frames which are respectively images of cross sections at an interval of a predetermined distance, each of the plurality of units having N blocks with N being an integer, the N blocks being respectively located at the same positions in N frames among the plurality of frames;
    sequentially selecting a pixel in one of the plurality of units as a target pixel in a predetermined order and selecting pixels located within a predetermined range near the target pixel as reference pixels;
    calculating a prediction value of a target pixel value which is a pixel value of the target pixel, according to the pixel values of the reference pixels and calculating a prediction error which is a difference between the prediction value and the target pixel value; and
    performing entropy coding of the prediction error in each of the plurality of units.

12. The computer readable medium according to claim 11, wherein
the calculating calculates the prediction value of the target pixel by summating values each obtained by multiplying each of the pixel values of the reference pixels by each of a weighting factor, and calculates the plurality of weighting factors in order to minimize the prediction error in each of the plurality of units.

13. The computer readable medium according to claim 12, further comprising, after the entropy coding, outputting compressed data which includes information concerning the 3D image data, the plurality of weighting factors, and the result of the entropy coding.

14. The computer readable medium according to claim 13, further comprising, before the image dividing, determining the number of the reference pixels and the positions of the reference pixels in order to minimize the size of the compressed data.

15. The computer readable medium according to claim 14, wherein
the determining determines at least N or size of each of the N blocks in order to minimize the size of the compressed data.

16. The computer readable medium according to claim 13, further comprising acquiring the plurality of weighting factors from the compressed data, decoding the compressed data to the prediction error by decoding processing corresponding to the entropy coding, and restoring a pixel value of the target pixel based on the plurality of weighting factors and the decoded prediction error.

17. The computer readable medium according to claim 11, wherein
the dividing compares pixel values at the same positions in the frames that constitute the image to detect an area to be excluded from a compression target, and
the selecting selects the target pixel and the reference pixels from among pixels in other than the detected area.

18. The image compression program according to claim 11, wherein
the reference pixels include pixels located within a predetermined range near the target pixel in a frame including the target pixel, and include a pixel located within a second predetermined range near a pixel at the same position as the target pixel in another frame within a predetermined range near the frame including the target pixel.

19. The computer readable medium according to claim 11, wherein
the selecting of the reference pixels selects the reference pixels starting from a pixel nearest to the target pixel until the number of the reference pixels reaches a predetermined number.

20. An image compression method that performs lossless compression of a 3D image data, comprising:
executing by a computer the operations of:
dividing the 3D image data into a plurality of units of data, the 3D image data being composed of a plurality of frames which are respectively images of cross sections at an interval of a predetermined distance, each of the plurality of units having N blocks with N being an integer, the N blocks being respectively located at the same positions in N frames among the plurality of frames;
sequentially selecting a pixel in one of the plurality of units as a target pixel in a predetermined order and selecting pixels located within a predetermined range near the target pixel as reference pixels;
calculating a prediction value of a target pixel value which is a pixel value of the target pixel, according to the pixel values of the reference pixels and calculating a prediction error which is a difference between the prediction value and the target pixel value; and
performing entropy coding of the prediction error in each of the plurality of units.

* * * * *

UNITED STATES PATENT AND TRADEMARK OFFICE
CERTIFICATE OF CORRECTION

PATENT NO. : 7,676,102 B2  Page 1 of 1
APPLICATION NO. : 11/485345
DATED : March 9, 2010
INVENTOR(S) : Kenichiro Sakai It is certified that error appears in the above-identified patent and that said Letters Patent is hereby corrected as shown below:

Column 17, Line 6, change "factor," to --factors,--.

Signed and Sealed this

First Day of June, 2010

David J. Kappos
*Director of the United States Patent and Trademark Office*